A. H. VON BORNSTEDT & C. P. BLECKER.
INDICATOR FOR PIANO KEYBOARDS.
APPLICATION FILED DEC. 15, 1915.
1,293,997.
Patented Feb. 11, 1919.
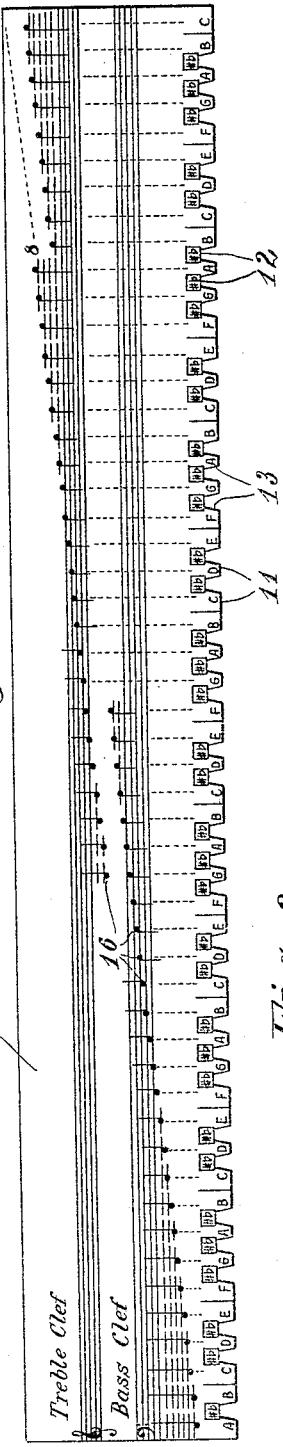
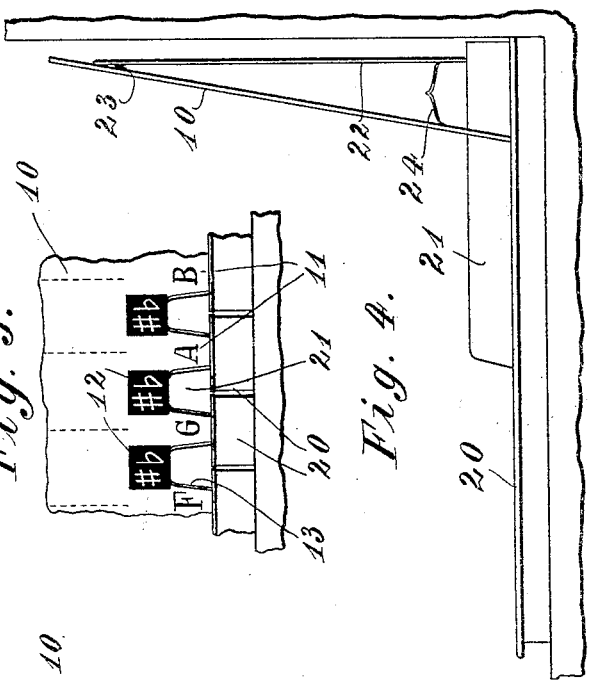
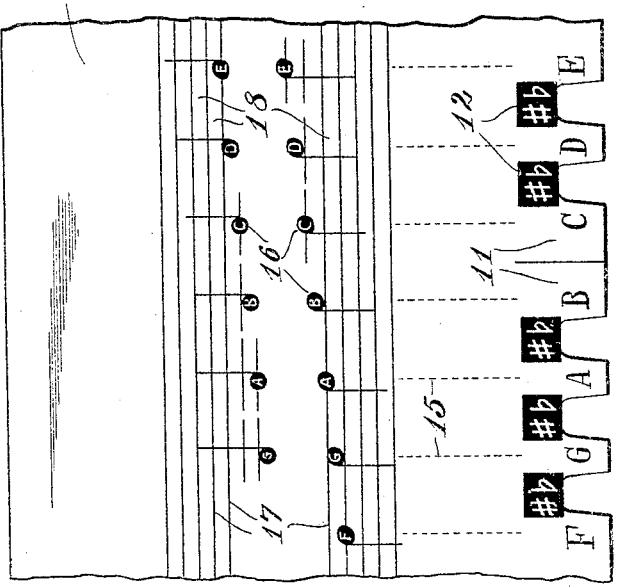
Inventors
Alfred H. von Bornstedt.
Claude P. Blecker.
By their Attorney
Oscar Geier

UNITED STATES PATENT OFFICE.

ALFRED H. von BORNSTEDT AND CLAUDE P. BLECKER, OF NEW YORK, N. Y.

INDICATOR FOR PIANO-KEYBOARDS.

1,293,997. Specification of Letters Patent. Patented Feb. 11, 1919.

Application filed December 15, 1915. Serial No. 67,007.

*To all whom it may concern:*

Be it known that we, ALFRED H. VON BORNSTEDT and CLAUDE P. BLECKER, citizens of the United States, and residents of New York, in the county of Bronx and State of New York, have invented certain new and useful Improvements in Indicators for Piano-Keyboards, of which the following is a specification.

This invention relates to improvements in means whereby the notes of a piano, organ or like instrument may be easily learned and memorized.

The principal object of the invention is to provide a chart upon which all the notes in the treble and bass staffs are indicated, as they appear in musical notation, together with their designations, the chart being suited to register with a standard keyboard, so that any note, be it sharp, flat or natural, can be instantly located with precision.

Another object is in the provision of a chart that can be applied or removed by any person, without tools or appliances, and which in nowise interferes with the use of the instrument or the sound it produces.

These and like objects are attained by the novel design and construction of the chart hereafter described and shown in the accompanying drawing, forming a material part of this invention, and in which:—

Figure 1 is a front elevation of a chart made according to the invention, drawn to a small scale.

Fig. 2 is a similar view showing a fragment of the chart including a single octave.

Fig. 3 is another fragmental front view illustrating its application to a key-board, and Fig. 4 is a side view of the same.

In the drawings it will be seen that the chart 10 extends the entire length of the keyboard and has clearly indicated upon it all of the keys, both white and black, the white being designated as 11 and the black by 12, the designating characters being shown in black and white, oppositely to the color of the key.

Extending vertically upward from each key are heavily inscribed, broken lines 15, leading to the corresponding notes 16, and it is to be noticed that the letters designating the notes appear directly in the head of the corresponding note and not at the side.

In the preferred form the base of the chart is notched, as at 13, so as to rest directly on the white keys 20, the blacks 21 being contained in the notches.

These charts may be made of any material having a smooth surface, relatively stiff, as cardboard or celluloid; they can be made in sections if preferred, in which case the adjoining ends may overlap when in use and when not required the sections may be readily stored.

In order to maintain the face of the chart perpendicular or preferably slanting slightly backward, there may be attached to its rear surface a plurality of supports 22 by flexible or hinge connections 23 and 24, which act in the manner of easel supports.

In operation, the instrument being open, the chart is disposed on the keys, close to their rear ends, in such position as to be readily seen by the player who is thus enabled to very rapidly master the keyboard by being able to correctly connect by means of the eye, the written note with its particular key.

Having thus described our invention, what we claim as new and desire to secure by Letters Patent, is:—

An instruction-scale for pianos, comprising a chart of the length of the piano keyboard, a plurality of supports for said chart, connections between said chart and supports acting in the manner of easel supports, said chart being notched to fit over the black keys of a piano-key-board, and tabs formed by the notches adapted to rest upon the white keys, said tabs arranged in groups, each group consisting of narrow tabs and wider tabs, two of the wider tabs being disposed between two of said narrow tabs, and a third, narrow tab being disposed between two wider tabs, notes on said chart, and broken lines extending vertically upward for each key and leading to the corresponding note, darkly colored portions at the inner edges of the notches, adapted to bear one and the same uncolored legend, the tabs of each series having in their consecutive order the inscriptions: A, B, C, D, E, F and G printed thereon for indicating the character of a note opposite to the key and notch or tab therefor, substantially as described and for the purpose set forth.

Signed at New York, in the county of New York, and State of New York, this 10th day of December, A. D. 1915.

ALFRED H. von BORNSTEDT.
CLAUDE P. BLECKER.

Copies of this patent may be obtained for five cents each, by addressing the "Commissioner of Patents, Washington, D. C."